US009945719B2

(12) United States Patent
Belk et al.

(10) Patent No.: US 9,945,719 B2
(45) Date of Patent: Apr. 17, 2018

(54) HIGH RESOLUTION THERMO-ELECTRIC NANOWIRE AND GRAPHENE COUPLED DETECTOR SYSTEM

(71) Applicant: The Boeing Company, Chicago, IL (US)

(72) Inventors: John H. Belk, St. Louis, MO (US); Jeffrey H. Hunt, Calle Riscoso, CA (US)

(73) Assignee: THE BOEING COMPANY, Chicago, IL (US)

( * ) Notice: Subject to any disclaimer, the term of this patent is extended or adjusted under 35 U.S.C. 154(b) by 233 days.

(21) Appl. No.: 14/570,624

(22) Filed: Dec. 15, 2014

(65) Prior Publication Data
US 2016/0169736 A1    Jun. 16, 2016

(51) Int. Cl.
*H01J 40/14* (2006.01)
*G01J 1/42* (2006.01)
*G01J 5/20* (2006.01)

(52) U.S. Cl.
CPC . *G01J 1/42* (2013.01); *G01J 5/20* (2013.01); *G01J 2005/202* (2013.01)

(58) Field of Classification Search
CPC ...... G02B 6/00; G02B 6/12; G01J 5/00; G01J 5/20
USPC ......... 250/208.1, 338.1, 336.2; 977/954, 955
See application file for complete search history.

(56) References Cited

U.S. PATENT DOCUMENTS

| | | | |
|---|---|---|---|
| 8,415,608 B2 | 4/2013 | Hunt | |
| 8,525,095 B2 | 9/2013 | Huber | |
| 8,664,583 B2 | 3/2014 | Hunt et al. | |
| 8,686,346 B2 | 4/2014 | Hunt | |
| 8,687,978 B2 | 4/2014 | Hunt et al. | |
| 8,729,456 B2 | 5/2014 | Hunt | |
| 8,744,272 B1 | 6/2014 | Hunt et al. | |
| 8,774,636 B2 | 7/2014 | Hunt et al. | |
| 8,809,761 B1 | 8/2014 | Hunt et al. | |
| 2008/0310790 A1* | 12/2008 | Wu | B82Y 20/00 385/12 |
| 2012/0193521 A1* | 8/2012 | Hunt | G01J 5/046 250/227.23 |
| 2012/0194713 A1 | 8/2012 | Hunt | |

(Continued)

OTHER PUBLICATIONS

Joshua B. Halpern, "Bi Nanowires as Topological Insulators", Howard University, DMR 0611595, https://www.nsf.gov/mps/dmr/highlights/12highlights/highlights2012/0611595_Halpern.pptx, pp. 1-2, 2012.

(Continued)

*Primary Examiner* — Kevin Pyo
(74) *Attorney, Agent, or Firm* — MH2 Technology Law Group LLP

(57) ABSTRACT

A frequency selective electromagnetic apparatus is provided. The apparatus may include at least one nanowire comprising a first end and a second end opposite the first end, at least one 2-dimensional contact disposed adjacent to the first end or the second end and in thermal communication, electrical communication, or both thermal and electrical communication with the at least one nanowire, and at least one nanoscale-sized-diameter thermoelectric junction disposed between the at least one 2-dimensional contact and the at least one nanowire.

36 Claims, 7 Drawing Sheets

(56) References Cited

U.S. PATENT DOCUMENTS

2015/0194549 A1* 7/2015 Weman .......... H01L 31/022466
    136/244

OTHER PUBLICATIONS

Tito E. Huber et al., "Thermoelectric Nanowire Junction Photoresponse", Abstract Only, International Thermoelectric Society, ICT2014, Jul. 6-10, 2014, Nashville, TN, USA, http://abstracts.its.org/abstractdetails/10706, pp. 1-7.

Tito E. Huber, "Experimental observation of Aharonov-Bohm conductance steps in bismuth nanowires", Abstract Only, 2013, http://www.ml.pan.wroc.pl/assets/files/seminar_arch/Srod-Sem-ML3_Huber_2013_abs.pdf, 1 page.

D. Dragoman et al., "Giant thermoelectric effect in graphene", Applied Physics Letters 91, 2007, pp. 203116-203116-3.

* cited by examiner

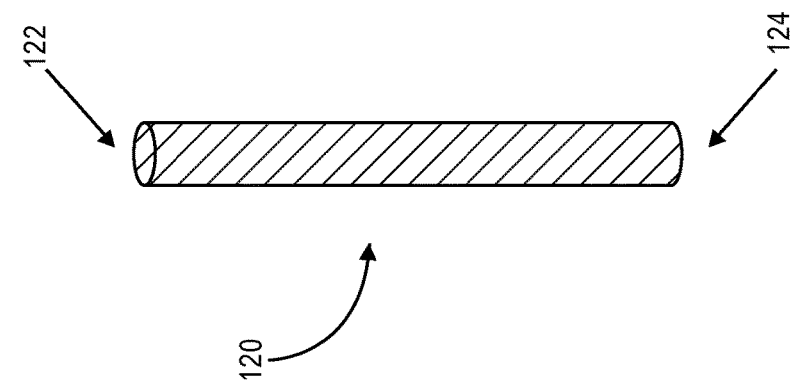
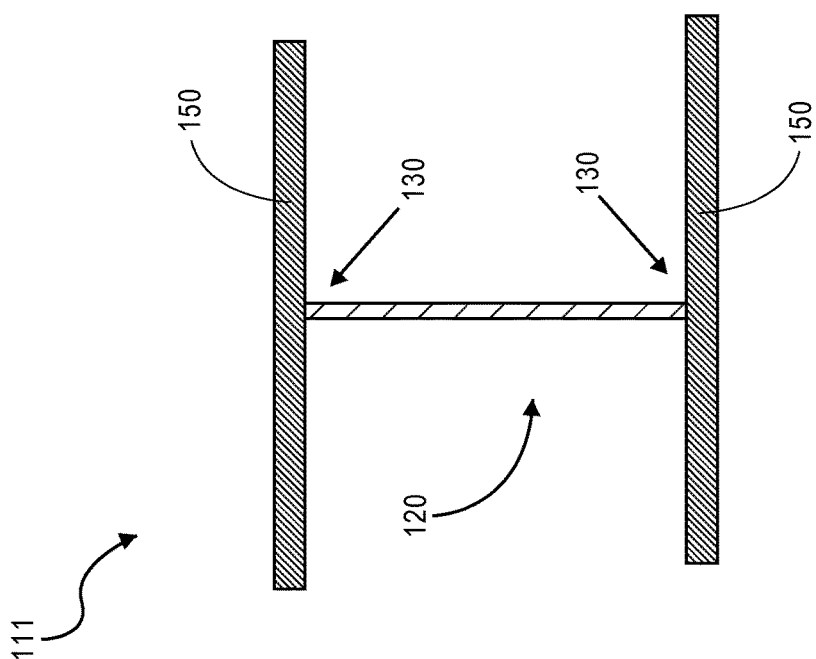

HIGH RESOLUTION THERMO-ELECTRIC NANOWIRE AND GRAPHENE COUPLED DETECTOR SYSTEM

FIELD

The present disclosure relates generally to sensors and, in particular, to sensor systems for detecting objects or the movement of objects, via frequency selective imaging systems.

BACKGROUND

Missile defense includes detecting, tracking, and neutralizing missiles. Missile defense may be especially useful for surface ships and aircraft. When surface ships are near the shore, missile launches may pose dangers to the surface ships. Sensor systems may be carried by aircraft to detect objects or the movement of objects. For example, an aircraft may perform reconnaissance missions using optical systems including telescopes to detect missile launches. These telescopes are moveable, mounted, and frequently operated by human operators.

Additionally, ships may scan the horizon using telescopes to look for incoming missiles that may skim the surface of the water. These types of telescopes have a limited field of view. As a result, the number of telescopes needed to provide a preferred coverage and number of operators to operate the telescopes may be greater than desired. Because of their narrow field of view, telescopes may miss launches at the moment they occur, reducing the amount of response time to the launch.

Other sensor systems may include forward looking infrared (FLIR) sensors. These types of sensors detect heat to generate an image. These sensors may include cameras that detect infrared light. The sensors may include various components such as filters, cryogenic cooling, and complex arrays of detectors. These sensors also are movably mounted because of the limited fields of view. With the increased complexity and the presence of moveable parts, the maintenance that may be needed for these sensor systems may be greater than desired.

Conventional optical imaging sensors typically operate as bulk frequency absorption devices. Many conventional optical imaging sensors employ bulk semiconductors, which absorb electromagnetic radiation across large frequency ranges and have no means to discriminate against electromagnetic radiation in specific frequency ranges. Conventional optical imaging sensors typically include a focal plane array of detectors. Each detector is a semiconductor pixel. These pixels absorb images at all frequencies, and convert them into electrical signal equivalents. However, these pixels have no means to maintain the wavelength selectivity in the image and, thus, that information is lost.

In order for these optical imaging sensors to be able to determine the colors they are sensing (i.e. achieve color discrimination), their pixels are typically grouped into square groupings of four, and a Bayer mask is placed in front of each square grouping of four pixels. A Bayer mask includes four color filters that are arranged in the form of a square. A Bayer mask has one red filter, one blue filter, and two green filters. Bayer masks include two green filters because the human eye is more sensitive to green than to red or blue. Each grouping of four pixels sends its sensed information to a processor for determining the specific color that they detect. As such, in order for these conventional optical imaging systems to be able to achieve color discrimination, a substantial amount of computation is required. In addition, it should be noted that the use of the four color filters results in reduced sensitivity of the sensor, lower image resolution, and increased noise.

Currently, many of the imagers that operate in the single photon regime are limited to image-intensifier tubes. These devices do not have wavelength selectivity. Image-intensifier tubes are constructed from tubes that are very delicate and, thus, they can easily be damaged. In addition, image-intensifier tubes require separate power supply devices.

As can be observed from the discussion above, optical imaging that can detect single-photons while maintaining wavelength sensitivity is very challenging to achieve. Therefore, it would be advantageous to have a method and apparatus that takes into account at least some of the issues discussed above as well as possibly other issues.

SUMMARY

Described herein is a frequency selective electromagnetic apparatus. The apparatus may include at least one nanowire comprising a first end and a second end opposite the first end, at least one 2-dimensional contact disposed adjacent to the first end or the second end, and in thermal communication, electrical communication, or both thermal and electrical communication with the at least one nanowire, and at least one nanoscale-sized-diameter thermoelectric junction disposed between the at least one 2-dimensional contact and the at least one nanowire.

Also disclosed is a frequency selective imaging system. The frequency selective imaging system can include at least one intensity control device that selects a range of a rate of arrival of photons that are to be sensed, at least one focusing element for focusing the photons, and at least one frequency selective imager that detects the photons that are focused from the at least one focusing element. The frequency selective imager can include an array of nanowires, at least one 2-dimensional contact disposed between a first one and second one of the nanowires and in thermal communication, electrical communication, or both thermal and electrical communication with the first one and second one of the nanowires, and at least one nanoscale-sized-diameter thermoelectric junction disposed between the at least one 2-dimensional contact and the first one or the second one of the nanowires. The frequency selective imager senses at least one photon and emits at least one electrical pulse having a voltage that is proportional to an energy level of the at least one photon. At least one processor for processing the at least one electrical pulse and for generating a multi-spectral image from information from the at least one electrical pulse may further be included in the frequency selective imaging system.

Also disclosed is a communications system. The system can include at least one intensity control device that selects a range of a rate of arrival of photons that are to be sensed, at least one focusing element for focusing the photons that are being sensed, at least one frequency selective electromagnetic detector that detects the photons that are focused from the at least one focusing element. The at least one frequency detector may include an array of nanowires, at least one 2-dimensional contact disposed between a first one and second one of the nanowires and in thermal communication, electrical communication, or both thermal and electrical communication with the first one and second one of the nanowires, and at least one nanoscale-sized-diameter thermoelectric junction disposed between the at least one 2-dimensional contact and the first one or the second one of the nanowires. The frequency selective imager senses at least one photon. In operation, the at least one frequency selective imager emits at least one electrical pulse having a voltage that is proportional to an energy level of at least one photon. The system may further include at least one processor for processing the at least one electrical pulse and for generating a multi-spectral image from information from the at least one electrical pulse.

Additional advantages will be set forth in part in the description which follows, and in part will be understood from the description, or may be learned by practice thereof. The advantages will be realized and attained by means of the elements and combinations particularly pointed out in the appended claims.

It is to be understood that the foregoing general description and the following detailed description are exemplary and explanatory and are not restrictive of that which is claimed.

The accompanying drawings, which are incorporated in and constitute a part of this specification, illustrate examples and together with the description, serve to explain the principles of that which is described herein.

BRIEF DESCRIPTION OF THE DRAWINGS

FIG. 2A is a view of a frequency selective electromagnetic apparatus.

FIG. 2B is a perspective view of a thermoelectric nanowire usable in a frequency selective electromagnetic apparatus.

DETAILED DESCRIPTION

Figure 1:
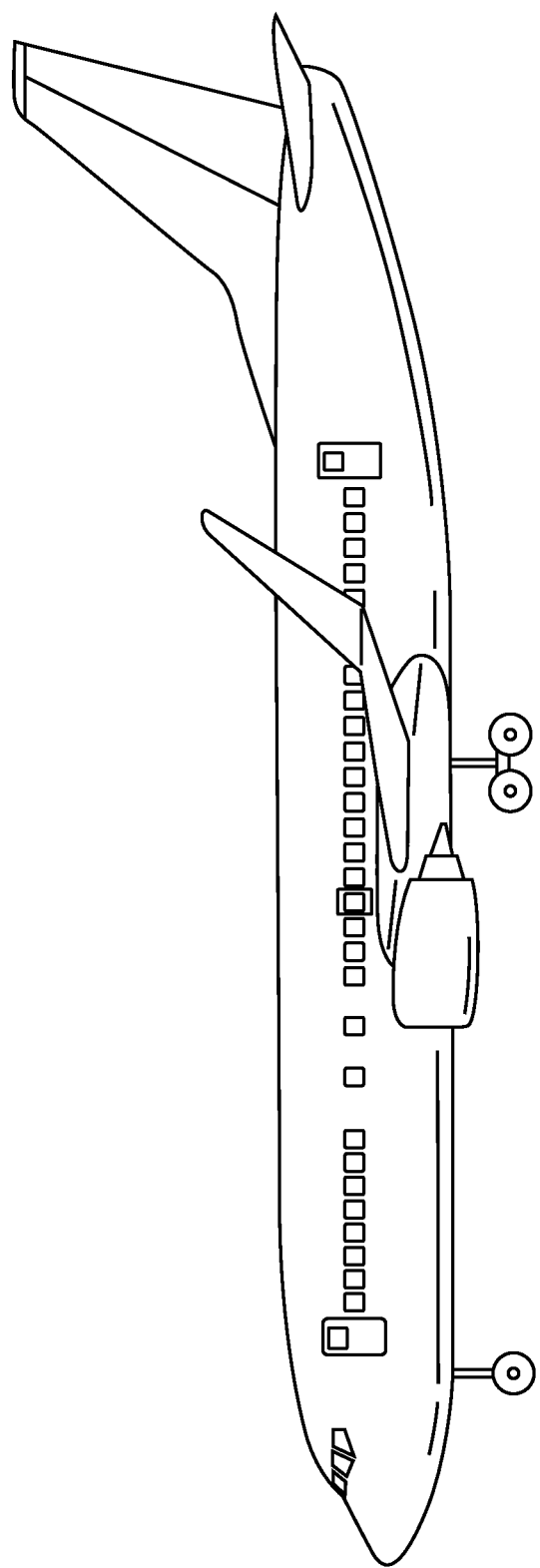
FIG. 1 illustrates one example of an aircraft.

Reference will now be made in detail to the present descriptions, examples of which are illustrated in the accompanying drawings. Wherever possible, the same reference numbers will be used throughout the drawings to refer to the same or like parts.

Notwithstanding that the numerical ranges and parameters setting forth the broad scope of the descriptions are approximations, the numerical values set forth in the specific examples are reported as precisely as possible. Any numerical value inherently contains certain errors necessarily resulting from the standard deviation found in their respective testing measurements. Moreover, all ranges disclosed herein are to be understood to encompass sub-ranges subsumed therein. For example, a range of "less than 10" can include sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g., −1, −2, −3, −10, −20, −30, etc.

It should be noted that the term "color" refers to the portion of the electromagnetic spectrum that is visible to the human eye. A typical human eye will respond to wavelengths that are approximately 330-770 nanometers (nm) in length. As such, the use of the term "color" here applies to the visible range of wavelengths, but it is directly analogous to any spectral regime that requires frequency discriminating optical elements.

The following is described for illustrative purposes with reference to the figures. Those of skill in the art will appreciate that the following description is exemplary in nature, and that various modifications to the parameters set forth herein could be made without departing from the scope of the present disclosure. It is intended that the specification and examples be considered as examples. The various descriptions are not necessarily mutually exclusive, as some descriptions can be combined with one or more other descriptions to form combined descriptions.

A pixel employing a nanoscale-sized diameter thermoelectric junction can achieve optical imaging for the single photon regime. That is, when a thermoelectric element is exposed to light, the electromagnetic field is dissipated in the element, and the energy that is deposited generates electrical power that can be used for sensing the light. This type of thermoelectric element is generally referred to as a bolometer. Generally, a bolometer is a device for measuring the energy of incident electromagnetic radiation.

It is possible to fabricate nanoscale-sized bolometers from nanoscale-sized diameter junctions, for example, at least one nanoscale-sized-diameter thermoelectric junction disposed between a 2-dimensional contact and a nanowire, such as at an interface between a 2-dimensional contact and an end of a nanowire. The thermoelectric effect originates in the nanoscale-sized diameter thermoelectric junctions where absorption of a photon creates a temperature difference and causes a voltage change. This can occur at the interface of two separate nanowires, at the interface of a nanowire and another contact, or even, in the case of topological insulators, between the bulk material and its own surface. Typically, values of generated voltage are measured in microvolts ($\mu V$) per degree Kelvin (K). Additionally, when a temperature difference is applied to the nanoscale-sized diameter thermoelectric junctions, the charged carriers in the nanowire, whether they are electrons or holes, diffuse from the nanoscale-sized diameter thermoelectric junctions to respective ones of electrical terminals or contacts, such as a 2-dimensional contact. In this way, the behavior is similar to the way that a classical gas expands when heated. As a result, the mobile charged carriers migrating to the electrical terminals, such as 2-dimensional contacts formed at respective ends of a nanowire, leave behind their oppositely charged and immobile nuclei at the nanoscale-sized diameter thermoelectric junctions thus giving rise to a thermoelectric voltage. As such, the nanoscale-sized diameter thermoelectric junctions are each in essence operating as a thermoelectric semiconductor. These nanoscale-sized diameter junctions respond to individual photons by emitting an individual electrical pulse having a voltage that is proportional to the temperature change caused by the absorption of the photon. The temperature change is proportional to the energy of the photon. Thus, these nanoscale-sized diameter junctions are sensitive to wavelength.

Recently, it has been demonstrated that as the wire diameter of a nanowire is reduced, thermal transport in the nanowire is drastically decreased because of less phonon scattering within the nanowire walls. In cases when signals or photons are arriving to the thermoelectric junction at high repetition rates, like those associated with optical communications carriers, for example, with multiple closely-spaced frequencies, as used in multifrequency division multiplexing, existing solutions typically involve the application of highly conductive metals such as copper and gold as terminal contacts. These are expensive and are difficult to apply in semiconductor growth environment, particularly when the growth mechanism is performed in manufacturing environment which has strict limits on materials which can be included, particularly for focal plane arrays, where the geometries need to be tightly controlled, even in heritage systems. In addition, there is an innate limitation in their conductivity which can only be enhanced by a small percentage by going to ultrapure metals.

While thermoelectric nanowires are well-established in their use for frequency selective detection of electromagnetic species, their utility, such as in imaging systems, is still limited by their ability to provide a large $\Delta T$ between the thermoelectric itself and the end of the wire, which is needed, among other things, to provide sufficient signal-to-noise ratio for good pixel amplitude and frequency discrimination. This is the case when one is dealing with thermoelectric beryllium telluride nanowires because there must be a mechanism to remove the heat efficiently from the end nanowire in order to be able to maintain the maximum $\Delta T$, as the output voltage is proportional to that temperature parameter. This becomes particularly true in two systems: i) imaging systems, where the small dimensions associated with pixels implies that waste heat can wreak havoc on the behavior of the individual thermoelectric nano wires that make up the individual imaging pixels, and ii) frequency multiplexed optical communications systems, where the small differences between optical carrier frequencies associated with frequency division multiplexing in the optical regime will result in very small differences in the $\Delta T$ and consequently, very small differences in $\Delta V$ on the signals generated by the thermoelectric nanowire and its interfaces. Any environmental externality will limit the sensitivity of the communication systems therefore limiting the number of channels that can be used on the thermoelectric nanowire electromagnetic detector. The most severe of these externalities will be the waste heat which can wreak havoc on the behavior of the individual thermoelectric nanowires whose frequency identification capability depends on the ability to discriminate between small levels and small distinctions in the amount of heat that is deposited and the subsequent change in temperature that occurs as a result.

Accordingly, in descriptions provided herein, a two-dimensional contact material (also referred to herein as a "2-dimensional" or "2-D" contact), such as graphene, or other lamellar or "Van der Waal" or "layered crystal" material, is used as a contact, for example, at least on one end, such as at either end, including both ends of a thermoelectric nanowire. Graphene, a 2-dimensional carbon sheet, is a relatively newly discovered material. Graphene can have great electrical conductivity, for example, if it is relatively pure of structure or, for example, if it is a few-layer stack. While not limited to any particular theory, it is believed that graphene's conductivity is enhanced if scattering from flaws or inclusions are mitigated or if it has certain atoms "intercalated" in between its layers, as in "bromine intercalated graphene" as described below. Not only can graphene have a very high electrical conductivity—making it suitable for measuring the induced voltage has caused in a thermoelectric material—but it also has extremely high thermal conductivity. This is due to the fact that the graphene band structure is a so-called V-band structure with the implication that electrons travel with zero effective rest mass. This means that not only do the electrons move at very high rates consistent with being a high conductivity material, it also means that the heat, as represented by the phonon excitations within graphene, also propagates very quickly through the graphene. The resulting heat can, therefore, be removed quickly to some outlying substrate. The result is that the presence of the graphene at ends of a thermoelectric nanowire will provide a greatly enhanced $\Delta T$ and therefore $\Delta V$. The resulting thermo-electric nanowire structure, therefore, has much higher signal-to-noise ratio, and a corresponding sensitivity allowing, for example, a communications system to distinguish small differences in the input frequencies, as compared to conventional structures that do not have the graphene contacts.

In tight geometries, because graphene is a two-dimensional structure, the thickness will only be on the order of 10 to 20 Å per layer, for example, in a structure with one or more layers, such as in a few-layer structure, considerably smaller than would be required with a bulk metal conductor such as gold or copper. As an example, the highest electrical conductivity is generally found in approximately 3-7 atomic layers for graphene. This facilitates the addition of the thermal conductor into an imaging system. In addition to the already specified thermal conduction, the graphene will allow for additional reduction of so-called dead space between the pixel elements of an imaging system. This is because with a thinner electrical contact and thermal conductor, there is more room for an active pixel detector, as defined by, for example, a thermoelectric nanowire.

Figure 3:
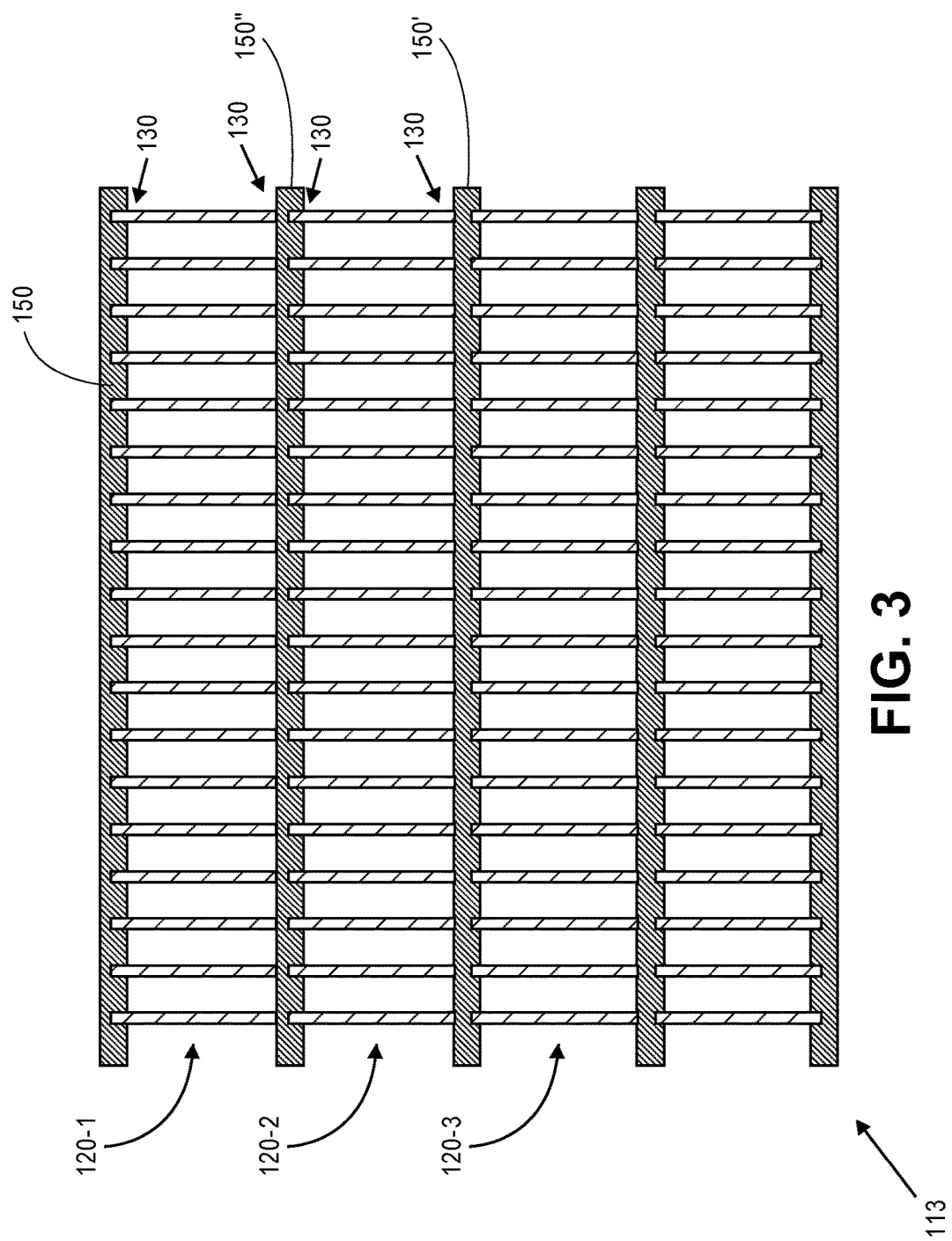
FIG. 3 is a view of a frequency selective electromagnetic apparatus.

Articles, such as an aircraft shown in FIG. 1, can include an imaging system, communications system, and/or detector system that include a frequency selective electromagnetic apparatus, as described below. A frequency selective electromagnetic apparatus 111, as illustrated in FIG. 2A, may include at least one nanowire 120. As illustrated in more detail in FIG. 2B, the at least one nanowire 120 may include a first end 122 and a second end 124. The at least one nanowire may be configured to generate a signal, such as an electrical signal, in response to receiving a photon. In an alternative arrangement, a frequency selective electromagnetic apparatus 113, as illustrated in FIG. 3, may include at least one nanowire 120, for example, an array of nanowires comprising a plurality of nanowires, 120-1, 120-2 and 120-3. It should be noted that FIG. 3 may be viewed as multiple ones of apparatus 111 of FIG. 2A. Although FIG. 3 shows the geometry from a side-on orientation, the arriving photons may impinge directly on the nanowires as shown, through the graphene, or through or around the contact at the other end of the nanowire on their way to the nanowire.

Returning to FIGS. 2A-2B, the apparatus 111 may also include at least one 2-dimensional contact 150 disposed adjacent to and in thermal communication, electrical communication, or both thermal and electrical communication with the at least one nanowire 120. At least one nanoscale-sized-diameter thermoelectric junction 130 may be disposed between the nanowire 120 and the at least one 2-dimension contact 150. The at least one 2-dimensional contact 150 may be a first 2-dimensional contact 150 disposed adjacent to a first end 122 of the at least one nanowire 120 and a second 2-dimensional contact 150 disposed on a second end 124 of the at least one nanowire 120. In an example, the at least one 2-dimensional contact 150 may be formed on the first end 122 of the at least one nanowire 120. In an example, the at least one 2-dimensional contact 150 may be formed on the second end 124 of the at least one nanowire 120. For example, the at least one 2-dimensional contact may be at least one monolayer which may be configured to abut and/or lay across end faces of the nanowire. Thus, an interface between the at least one 2-dimension contact and the nanowire may include the nanoscale-sized-diameter thermoelectric junction 130. For example, a nanoscale-sized-diameter thermoelectric junction 130 may be disposed between first end 122 of the at least one nanowire 120 and the at least one 2-dimensional contact 150, and/or between second end 124 of the at least one nanowire 120 and the at least one 2-dimensional contact 150.

As illustrated in the apparatus 113 of FIG. 3, the at least one nanowire may include multiple ones of the nanowire 120, such as at least one first nanowire 120-1 disposed between at least one 2-dimensional contact 150 and at least one 2-dimensional contact 150', at least one second nanowire 120-2 disposed between at least one 2-dimensional contact 150' and at least one 2-dimensional contact 150", and at least one third nanowire 120-3 disposed between at least one 2-dimensional contact 150" and at least one of a 2-dimensional contact (not labeled). It should be noted that 2-dimensional contact 150' and 150" may comprise the same material limitations and options as described herein for the at least one 2-dimensional contact 150.

In an exemplary arrangement, a first one and a second one of first nanowire 120-1 are disposed adjacent to one another, but do not physically contact one another, and each of the nanowires may have a first end 122 adjacent to a first one of contact 150, and a second end 124 adjacent to a second one of contact 150'. In other words, the at least one nanowire 120-1 may include a row of nanowires, with each nanowire in that row disposed between 2-dimensional contact 150 and 2-dimensional contact 150'. Accordingly, there may be at least one nanoscale-sized-diameter thermoelectric junction 130 disposed between a first end 122 of one or more of the at least one nanowire 120-1 and the at least one 2-dimensional contact 150, and/or between second end 124 of one or more of the at least one nanowire 120-1 and the at least one 2-dimensional contact 150'.

In another exemplary arrangement, the at least one nanowire may include at least one first nanowire 120-1 and a at least one second nanowire 120-2, wherein the at least one second nanowire 120-2 is disposed adjacent to, but does not physically contact, the first nanowire 120-1, and wherein the at least one 2-dimensional contact 150' is disposed between the first and the second nanowires. That is, a first nanowire 120-1 may be disposed adjacent to, but not in contact with, a second nanowire 120-2, a first end 122 of first nanowire 120-1 may be disposed adjacent to contact 150 and a second end 124 of the first nanowire 120-1 may be disposed adjacent to contact 150. Meanwhile, a second end 124 of nanowire 120-2 may also be formed adjacent to contact 150' and a first end 122 of nanowire 120-2 may be disposed adjacent to contact 150". In other words, the at least one nanowire 120-1 may include a row of nanowires, with each nanowire in that row in communication with and disposed between 2-dimensional contact 150 and 2-dimensional contact 150', and the at least one nanowire 120-2 may include a row of nanowires, with each nanowire in that row in communication with and disposed between 2-dimensional contact 150' and 2-dimensional contact 150". Accordingly, there may be at least one nanoscale-sized-diameter thermoelectric junction 130 disposed between a first end 122 of one or more of the at least one nanowire 120-1 and the at least one 2-dimensional contact 150 and/or between second end 124 of one or more of the at least one nanowire 120-1 and the at least one 2-dimensional contact 150', and/or there may be at least one nanoscale-sized-diameter thermoelectric junction 130 disposed between a first end 122 of one or more of the at least one nanowire 120-2 and the at least one 2-dimensional contact 150' and/or between second end 124 of one or more of the at least one nanowire 120-2 and the at least one 2-dimensional contact 150". It should be noted that because the at least one nanowire described above may be a semiconductor, for example an n-type or a p-type semiconductor, an exemplary configuration in any of the rows may include a plurality of nanowires of different semiconductor types. Accordingly, any of the rows of nanowires described above may include an arrangement of alternating semiconductor type nanowires, wherein every other nanowire in a given row is for example, n-type, and the rest p-type, and are all arranged in series.

The at least one 2-dimensional contact, for example, 2-dimensional contact 150, 150' and/or 150" may be in thermal communication, electrical communication, or both thermal communication and electrical communication, with at least one nanowire. In a general example the 2-dimensional contact may be thermally conductive in order to transport heat, such as via generation of phonons, away from the nanowire 120. In other words, the thermal communication may include absorbing a change in temperature generated by transport of phonons excited upon the at least one nanowire accepting a photon. In an example, 2-dimensional contact 150 may be electrically conductive in order to transport holes, electrons or both holes and electrons, to and/or from the nanowire 120. In other words, the electrical communication may include transporting a signal indicative of a change in voltage generated by transport of electrons, holes or both electrons and holes generated upon the at least one nanowire accepting a photon. It should be noted that the electrical properties of the electrical communication between 2-dimensional contact 150 and nanowire 120, and thermal properties of the thermal communication between 2-dimensional contact 150 and nanowire 120 are decoupled from each other. It should be noted that in bulk materials, the coefficients of thermal conductivity and electrical conductivity are coupled (i.e., they are the same within a constant, and are, therefore, both driven by the same physical phenomena). However, in non-bulk geometries employed in the examples, such as the at least one 2-dimensional contact 150 that may be formed of stacked-atomic layer materials, such as two-dimensional graphene, the nanowires 120 that may be formed of one-dimensional (1-D) thermoelectric, and the nanoscales-sized-diameter thermoelectric junction 130, such as an interface, disposed between the contact and thermoelectric nanowires, the effects of physical phenomena on electrical conductivity and thermal conductivity are decoupled. Accordingly, electrical conductivity and thermal conductivity of the apparatus and systems described in the examples herein are decoupled such that either can be enhanced or suppressed independently.

A thickness, extent and composition of the at least one 2-dimensional contact 150 may be selected independently, or in combination, to provide a tuned contact for providing a preselected thermal conductivity, electrical conductivity, and optical transparency. The at least one 2-dimensional contact 150 may be a single molecule, and/or may comprise a thickness of a single molecule. The at least one 2-dimensional contact 150 may be a single layer or may include more than one layer, wherein at least one of the layers has a thickness of a single molecule. Alternatively, all of the layers forming the at least one 2-dimensional contact 150 may have a thickness of a single molecule.

The at least one 2-dimensional contact 150 may be formed of graphene. Graphene may be provided in various configurations. For example, the graphene may be monolayer graphene, bi-layer graphene, few-layer graphene, bromine-intercalated graphene, or mixtures thereof. Some forms of bromine-doped graphene may include the bromine-intercalated graphene in which bromine is disposed between layers of graphene. The at least one 2-dimensional contact 150 may be formed of "stacked atomic layers" which include lamellar/van der Waal's materials. For example, contact 150 may include $WS_2$, $MoS_2$, hexagonal boron nitride (h-BN), reduced graphene oxide (rGO), other 2-dimensional materials, or mixtures thereof. Each of the at least one contact 150 in FIG. 2A, or the at least one contact 150 including first contact 150', second contact 150", and third contact 150''' may comprise any of the materials described above for the at least one contact 150. The first one of contact 150 adjacent to end 122 of the nanowire may include a different material, such as a different formulation of combinations of materials, than that of second one of contact 150 adjacent to end 124 of the nanowire.

As previously mentioned, the at least one nanowire 120 of the frequency selective apparatus is preferably manufactured from a compound material containing Be and Te, such as beryllium telluride (BeTe). However, the frequency selective apparatus may be manufactured from other materials that exhibit thermoelectric properties that are similar to the thermoelectric properties of BeTe. In general, the materials to be used are selected according to the desired operational frequency range of the frequency selective apparatus. In addition, it should be noted that the diameter of the nanoscale-sized diameter thermoelectric junctions 130 will also generally be selected according to the desired operational frequency range.

While various descriptions herein refer to an at least one nanowire, the examples are not so limited and it should be noted that at least one microwire may be used in place of at least one of the at least one nanowire. For example, nanowires and microwires of the examples, may generally include wires having diameters in a size range of about 1 nm to about 125 μm. The at least one nanowire may, therefore, have a diameter in a size range of about 50 nm to about 200 nm. In an example, the at least one nanowire may have a diameter in a size range associated with nanoparticles, which are 1-100 nm in size, and a length that is longer than the diameter of the nanowire, for example, a length of a nanowire in a size range from millimeters (mm) to centimeters (cm). Accordingly, the at least one nanowire can have a high aspect ratio. Additionally, the at least one nanowire may have a cross-section in a nanoscale dimension, including nanoscale-sized cross-section, and having a cross-sectional shape selected from ribbon, triangular, rectangular, octagonal, round, ribbed, and the like. The at least one nanowire 120 may be a thermoelectric nanowire. That is, the at least one nanowire 120 may be formed of a material or combination of materials with a thermoelectric response, including a conductor and a semi-conductor. For example, the at least one nanowire 120 may include beryllium (Be), bismuth (Bi), tellurium (Te), antimony (Sb), tin (Sn), lead (Pb), selenium (Se), nickel (Ni), cobalt (Co) or compound materials including any combination of Be, Bi, Te, Sb, Sn, Pb, Se, Ni and Co. The at least one nanowire 120 may be a composite nanowire formed of more than one material, such as more than one material selected from Be, Bi, Te, Sb, Sn, Pb, Se, Ni and Co. Each nanowire, or the array of nanowires (as discussed below), may be formed by any of many ways including lithographically, epitaxially, by guided self-assembly, by extrusion, by chemical processes, and other various growth techniques, or combinations thereof.

As discussed above, the at least one nanowire 120 may be configured in an array, including a 2-dimensional array and a 3-dimensional array, such as a volumetric array. It should be noted that a 3-dimensional array of nanowires may include several layers of a 2-dimensional array, such as several layers of a two dimensional array of frequency selective electromagnetic detectors, for example, several layers of the apparatus 113 of FIG. 3, with each layer of the 2-dimensional arrays formed each one behind the other. One advantage of a 3-dimensional array provides that if the absorption coefficient in the nanowire of one layer is not large enough to detect all the input light (in other words, some light leaks through), then nanowires in subsequent layers may "catch" the remaining light. Another advantage of a 3-dimensional array provides that detection of photons from incoming light by nanowires of subsequent layers of nanowires could be used to glean phase information, instead of just amplitude, of the detected photons.

Figure 4:
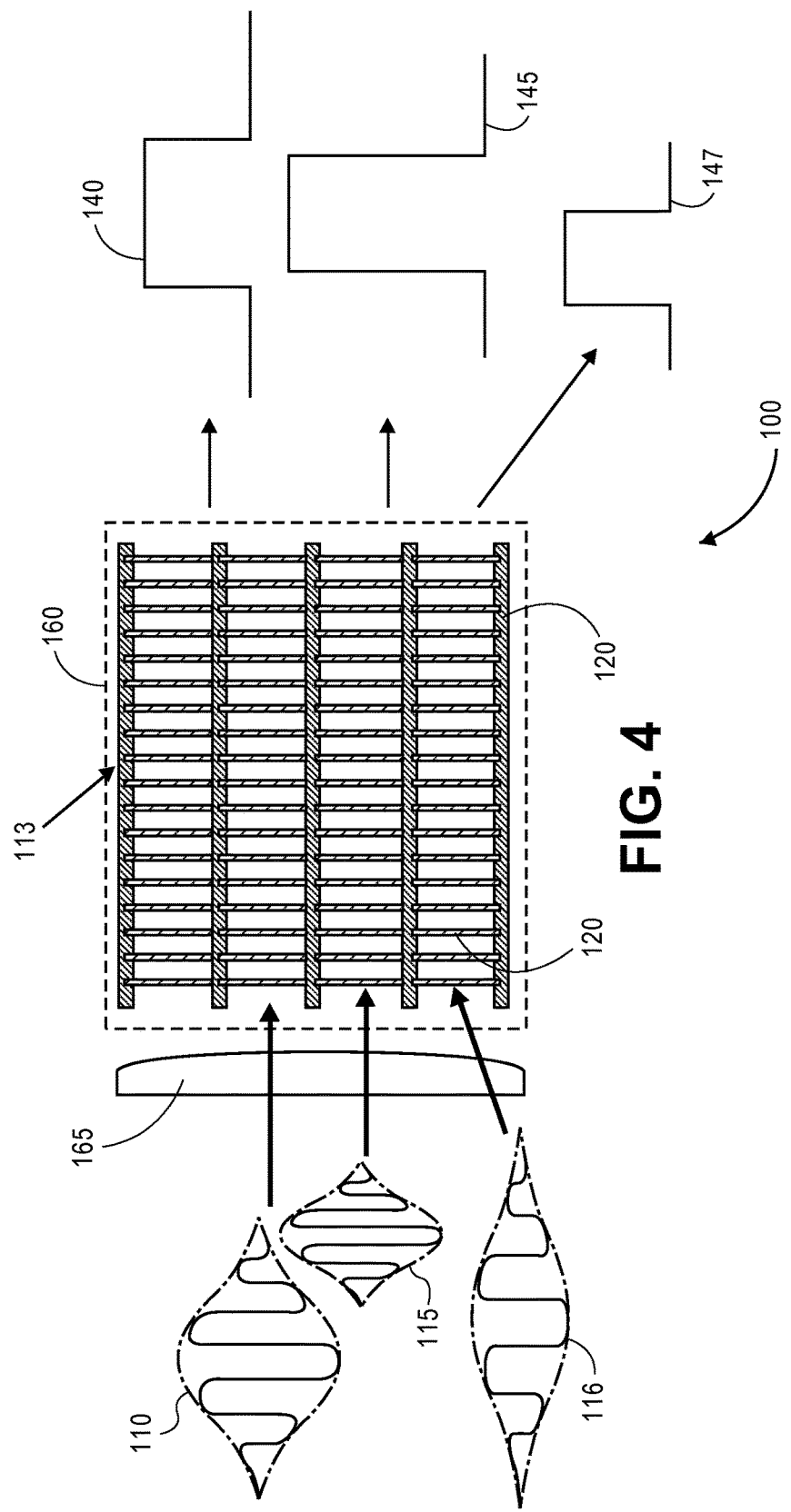
FIG. 4 is a view of a frequency selective electromagnetic apparatus in operation.

FIG. 4 shows a simplified block diagram of the disclosed frequency selective electromagnetic apparatus, such as apparatus 113 of FIG. 3, functioning as an imager during operation 100. In this figure, three photons 110, 115, 116 are shown to be propagated towards a frequency selective imager 160. Accordingly, apparatus 113 may further include at least one optical element 165 that is configured for manipulating electromagnetic energy arriving at the at least one nanowires, the manipulating comprising one or more filtering, focusing, gathering and collimating the electromagnetic energy. The photons are propagated onto a collection surface of a focusing element 165. The focusing element 165 may include an array of lenses. Types of devices to be employed for the focusing element include, but are not limited to, a single lens, a double lens, an array of lenses, a Fresnel lens, refractive elements, reflective elements (e.g., concave mirrors), and other related lens systems up to the complexity of a fully engineered telescope. The focusing element 165 may be used to focus the photons onto the frequency selective imager 160, including apparatus 113.

Each photon has a frequency (e.g., photon 110 has frequency v1, photon 115 has frequency v2, and photon 116 has frequency v3), which is proportional to its respective level of energy (e.g., photon 110 has energy level E1, photon 115 has energy level E2, and photon 116 has energy level E3). Energy (E) is equal to hv, where h is equal to the Planck constant and v is equal to frequency. It should be noted that for a given frequency (v), its corresponding wavelength (λ) is equal to c/v, where c is equal to the speed of light.

Also in FIG. 4, the frequency selective imager 160 includes a pixel array comprising a plurality of pixels. Each of the plurality of pixels includes at least one of nanowire 120. During operation of the disclosed frequency selective imager 160, when the nanoscale-sized diameter thermoelectric junctions of the at least one nanowire in apparatus 113 each sense a photon 110, 115, 116, each nanoscale-sized diameter thermoelectric junction emits an electrical pulse 140, 145, 147 via the contacts 150 that are adjacent to, and in thermal and/or electrical communication with the corresponding nanowire. The voltage of each of the emitted electrical pulses 140, 145, 147 is proportional to the respective sensed photon's 110, 115, 116 level of energy and, thus, the magnitude of each of the emitted electrical pulses 140, 145, 147 can be used to determine the respective photon's 110, 115, 117 associated frequency.

It should be noted that the operational frequency detection regime of any material operating as a conventional semiconductor is limited to shorter wavelengths because photons having longer wavelengths do not have enough energy to excite the electrons across the material band gap. When wavelengths have photon energy that is below that of the material band gap, the semiconductor material will not respond. Thus, the implication is that selection of the materials that nanowires 120 are made from will determine the operational frequency of the apparatus 111, including apparatus 113 functioning as an imager 160. Accordingly, while not limited to any particular range of detection, a range of detection, for example, for the frequency selective electromagnetic apparatus 111, apparatus 113, such as for systems 100, 200 and 300 includes from about 100 microns to about 0.1 micron including frequency discrimination (the narrow band aspect) that may be on the order of $10^{-3}$ micron. In other words, photons with wavelength differences on the order of about $10^{-3}$ micron may be resolvable by, for example, the apparatus 111, apparatus 113 and systems 100, 200, and 300 described herein.

Figure 5:
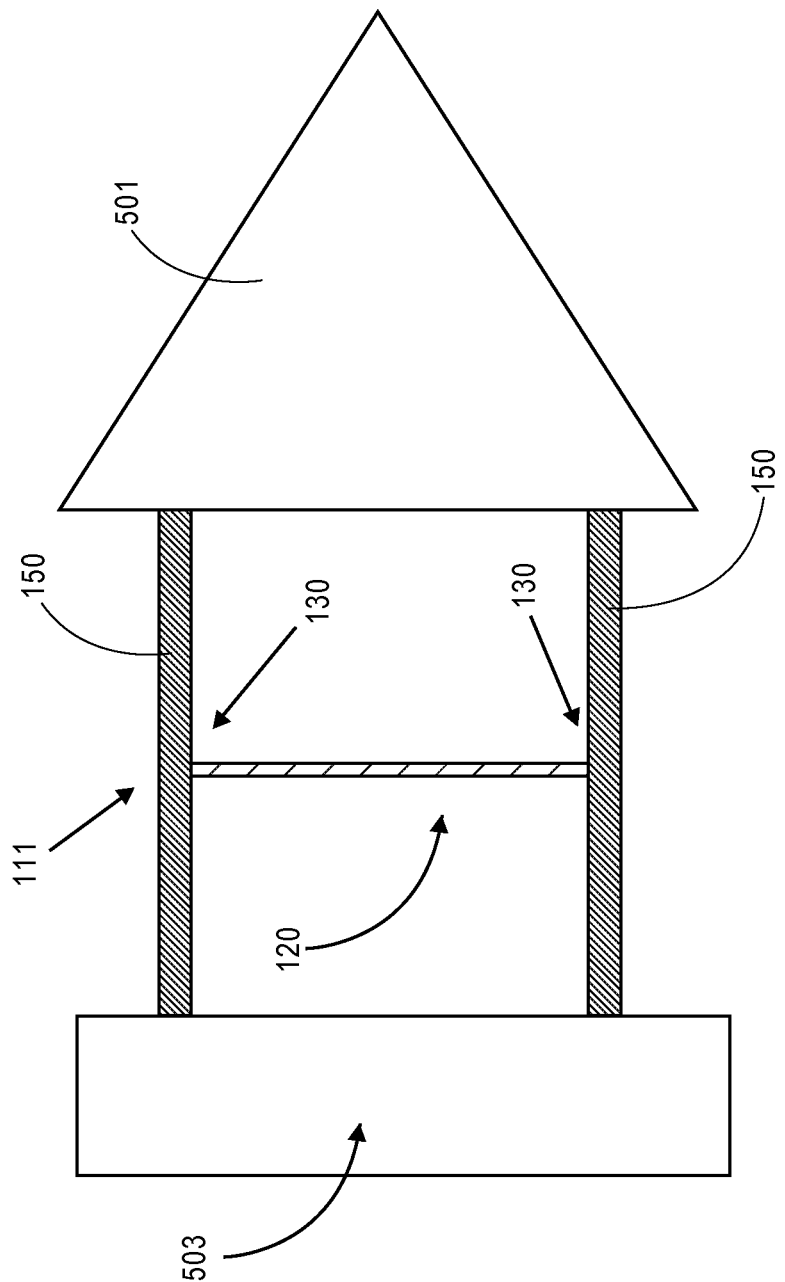
FIG. 5 is a view of a frequency selective electromagnetic apparatus.

As illustrated in FIG. 5, the apparatus 111 may further include an amplifier 501 that receives the signals generated by the at least one nanowire 120 and transported through, or along, the at least one contact 150. The apparatus 111 may further include a substrate 503 for accepting heat generated at the at least one nanowire upon the at least one nanowire accepting a photon that generates a charger carrier, and the charge carrier is communicated away from the at least one nanowires. Accordingly, while not shown in a figure, apparatus 113 may also include an amplifier and substrate as described above for apparatus 111.

Frequency Selective Imaging System

A frequency selective imaging system may include apparatus 111 of FIG. 2A and/or the apparatus 113 of FIG. 3. For example, a frequency selective imaging system can include at least one intensity control device that selects a range of a rate of arrival of photons that are to be sensed, at least one focusing element for focusing the photons that are being sensed, at least one frequency selective imager that detects the photons that are focused from the at least one focusing element, wherein the at least one frequency selective imager is formed from an apparatus such as apparatus 113. It should be noted that the frequency selective imaging system may include at least one polarization control device for selecting a polarization of the photons that are to be sensed, but the at least one polarization control device is optional. The frequency selective imager senses at least one photon, the at least one frequency selective imager emits at least one electrical pulse having a voltage that is proportional to an energy level of at least one photon. The frequency selective imaging system may, therefore also include at least one processor for processing the at least one electrical pulse and for generating a multi-spectral image from information from the at least one electrical pulse, and a display for displaying the multi-spectral image.

The frequency selective imager can include an array of nanowires, at least one 2-dimensional contact disposed between a first one and second one of the nanowires and in thermal communication, electrical communication, or both thermal and electrical communication with the first one and second one of the nanowires, and at least one nanoscale-sized-diameter thermoelectric junction disposed between the at least one 2-dimensional contact and the first one or the second one of the nanowires, It should be noted that the at least one 2-dimensional contact may be formed of graphene or the other materials described above.

Figure 6:
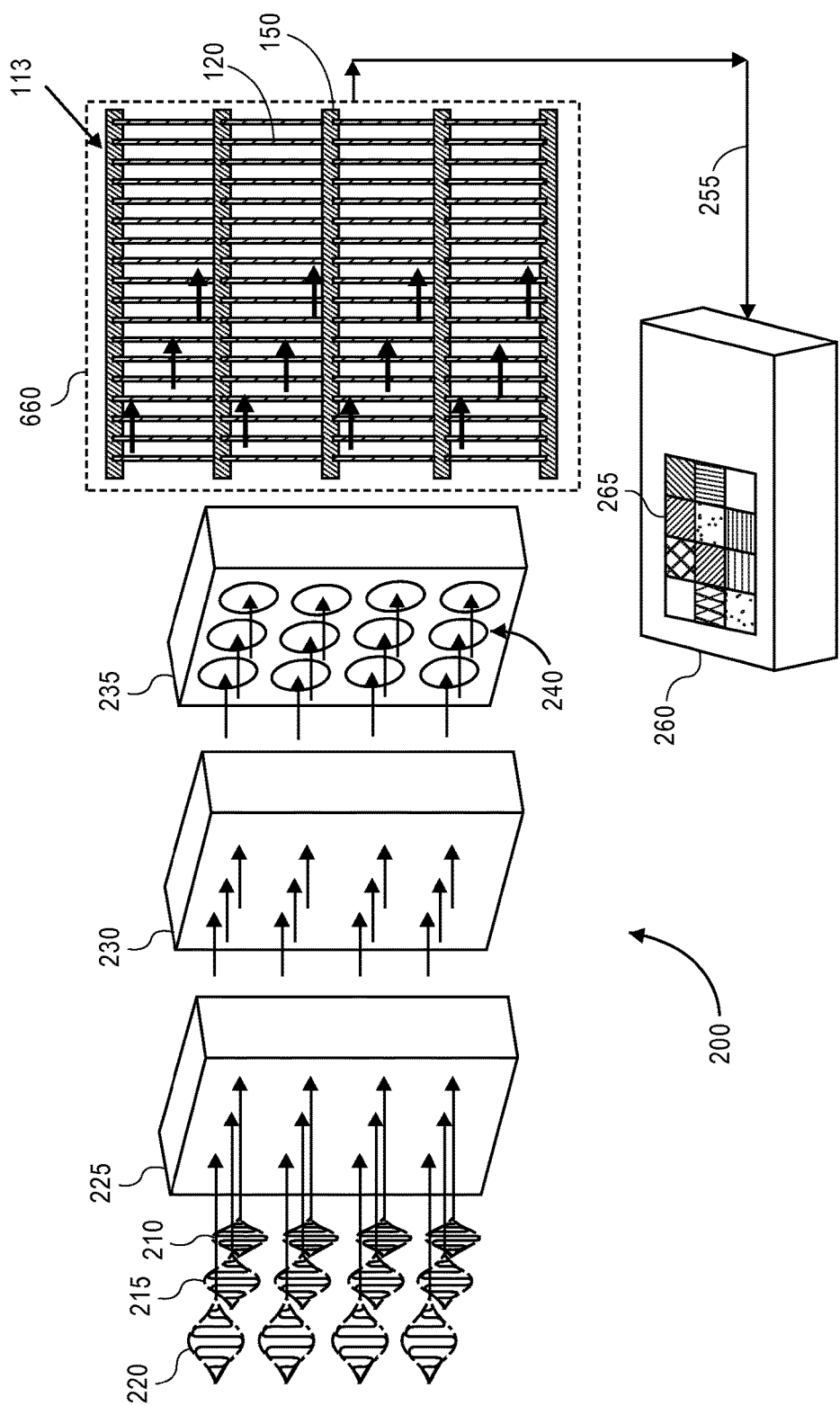
FIG. 6 shows a simplified block diagram of the disclosed frequency selective imaging system.

FIG. 6 shows a simplified block diagram of the disclosed frequency selective imaging system 200 that includes at least one of the apparatus 113. In order to understand the operation of the disclosed system 200, the path of a few photons 210, 215, 220 travelling through the system 200 is described. It should be noted that each of the photons 210, 215, 220 has a different wavelength (i.e., the photons are multi-spectral). In this figure, the photons 210, 215, 220 are shown to be propagated into an intensity control device 225. The intensity control device 225 is used to set a range of operation for the disclosed system 200 (i.e., to select a range of the rate of arrival of the photons that are desired to be sensed) and, thus, it operates as an electromagnetic energy filtering device. Types of devices that may be employed for the disclosed intensity control device 225 include, but are not limited to, a neutral-density filter and a dark color filter. The photons 210, 215, 220 are outputted from the intensity control device 225 and may be propagated into a polarization control device 230. The optional polarization control device 230 may be utilized for selecting a polarization of the photons that are desired to be sensed and, as such, it operates as a polarizer. The polarization control device 230 may select various different polarizations including, but not limited to, horizontal polarization, vertical polarization, left-hand circular polarization, and right-hand circular polarization. Types of devices that may be used for the disclosed polarization control device 230 include, but are not limited to, a polarization plate, a Brewster's angle polarizer, and a thin film polarizer. The precise type of polarization control device 230 to be selected for the system 200 depends upon the particular engineering requirements, such as the polarization rejection ratio, the size and weight limitations of the polarizer, and the wavelength range of operation.

From the output of the polarization control device 230, the photons 210, 215, 220 are propagated onto a collection surface of a focusing element 235. The focusing element 235 is shown to include an array of lenses 240. Types of devices to be employed for the focusing element 235 include, but are not limited to, a single lens, a double lens, an array of lenses, a Fresnel lens, refractive elements, reflective elements (e.g., concave mirrors), and other related lens systems up to the complexity of a fully engineered telescope. The focusing element 235 is used to focus the photons 210, 215, 220 onto a frequency selective imager 660, which includes the apparatus 113. The frequency selective imager 660 includes an array of pixels, which may be arranged in a focal plane array. Each of the pixels includes the at least one nanowire 120 in communication with at least one 2-dimensional contact 150, which may be formed of graphene, on the ends of the at least one nanowire as described above such that at least one nanoscale-sized-diameter thermoelectric junction is disposed between the at least one nanowire and the at least one 2-dimensional contact. That is, the at least one nanowire 120 and the 2-dimensional contact 150 may be in thermal communication, electrical communication or both thermal and electrical communication.

Once the frequency selective imager 160 senses the photons 210, 215, 220, the frequency selective imager 660 emits electrical pulses that each have a voltage that is proportional to the respective sensed photon's 210, 215, 220 energy level. The electrical pulses are sent via a composite array output 255 to the input of a processor 260 for processing. The processor 260 then uses the emitted electrical pulse information to determine each of the photon's 110, 115, 120 associated frequency and/or wavelength. The processor 260 uses this information from the photons 110, 115, 120 to generate a multi-spectral image, for example, on a display 265.

It should be noted that the array of pixels in the frequency selective imager 660 may be arranged in a scanning linear array rather than in a focal plane array. In addition, each pixel may include more than one nanowire 250 (i.e., each pixel may include more than one nanoscale-sized diameter thermoelectric junction). Additionally, a pixel may include other additional devices (e.g., a charge-coupled device (CCD)) than just a nanowire(s).

For the disclosed system 200, a procedure is necessary to provide for frequency calibration. Typically, this involves using emission spectra from samples (e.g., neon and mercury) that have frequency outputs that are well characterized and traceable to a standard calibration, such as the National Institute of Standards and Technology (NIST) standards. With these outputs propagated through the frequency selective imager 660 and operationally correlated to the known standards, the overall system 200 will be frequency calibrated.

In addition, a procedure is necessary to provide for temporal calibration for the system 200. Generally, this involves using timing pulses at one or more frequencies that have pulse spacing that is well defined. Usually, high precision devices will be tied to absolute standards generated by NIST or some other carefully calibrated sources. With these outputs propagated though the frequency selective imager 660 and operationally correlated to the known standards, the overall system 200 will be temporally calibrated.

Communications System

A communications system for sensing a sequence of photons may include the apparatus 111 of FIG. 2A and/or the apparatus 113 of FIG. 3. The system can include at least one intensity control device that selects a range of a rate of arrival of photons that are to be sensed, at least one focusing element for focusing the photons that are being sensed, at least one frequency selective electromagnetic detector that detects the photons that are focused from the at least one focusing element, and may include at least one polarization control device for selecting a polarization of the photons that are to be sensed, although the at least one polarization control device is optional. The frequency selective detector detects at least one photon. In operation, the at least one frequency selective detector emits at least one electrical pulse having a voltage that is proportional to an energy level of at least one photon. The communications system may, therefore, further include at least one processor for processing the at least one electrical pulse and for generating a multi-spectral image from information from the at least one electrical pulse.

The at least one frequency detector may include an array of nanowires, at least one 2-dimensional contact disposed between a first one and second one of the nanowires and in thermal communication, electrical communication, or both thermal and electrical communication with the first one and second one of the nanowires, and at least one nanoscale-sized-diameter thermoelectric junction disposed between the at least one 2-dimensional contact and the first one or the second one of the nanowires.

Figure 7:
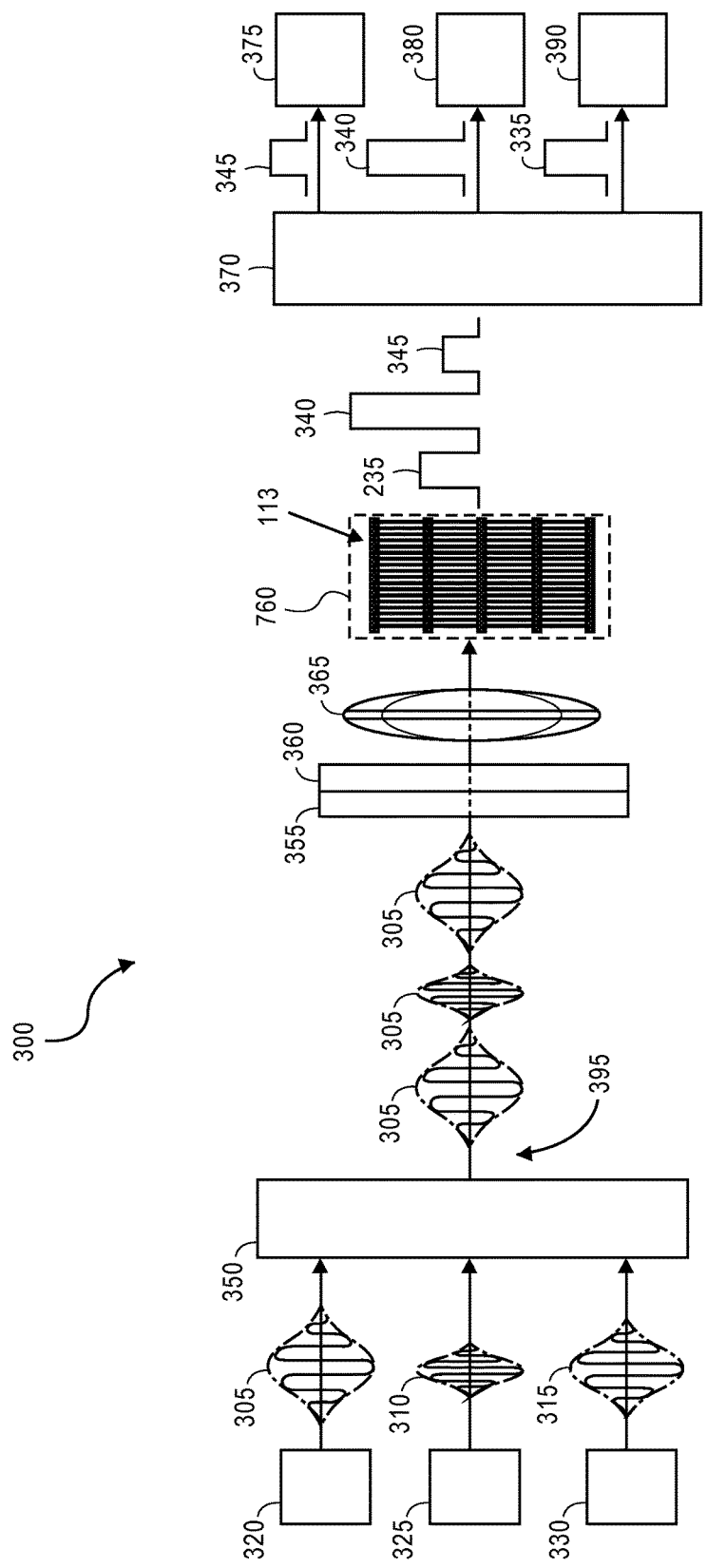
FIG. 7 shows a simplified block diagram of a frequency selective communications system.

FIG. 7 shows a simplified block diagram of the disclosed frequency selective communications system 300 for sensing a sequence of multi-wavelength photons. In particular, this figure illustrates how the disclosed frequency selective communications system provides multi-spectral communication between independent senders 320, 325, 330 and receivers 375, 380, 390. In order to understand the operation of the disclosed system 300, the path of a sequence of photons 305, 310, 315 travelling through the system 300 is described.

In this figure, three independent senders 320, 325, 330 are shown to output encoded data photons 305, 310, 315, which have unique frequencies and polarizations for transmission. The photons 305, 310, 315 are sent to a multi-spectral multiplex unit 350. The multiplex unit 350 merges the multi-spectral photons 305, 310, 315 in a sequence for transmission across fiber-optic links, free-space links, or other applicable communication links 395.

The sequence of multi-spectral photons 305, 310, 315 is then propagated into an intensity control device 355. The intensity control device 355 is used to set a range of operation for the disclosed system 300 (i.e., to select a range of the rate of arrival of the photons that are desired to be sensed) and, thus, it operates as an electromagnetic energy. Types of devices that may be employed for the disclosed intensity control device 355 include, but are not limited to, a neutral-density filter and a dark color filter.

The sequence of photons 305, 310, 315 is outputted from the intensity control device 355, and is propagated into a polarization control device 360. The polarization control device 360 is utilized for selecting a polarization of the photons that are desired to be sensed and, as such, it operates as a polarizer. The polarization control device 360 may select various different polarizations including, but not limited to, horizontal polarization, vertical polarization, left-hand circular polarization, and right-hand circular polarization. Types of devices that may be used for the disclosed polarization control device 360 include, but are not limited to, a polarization plate, a Brewster's angle polarizer, and a thin film polarizer. The precise type of polarizer device to be selected for the system 300 depends upon the particular engineering requirements, such as the polarization rejection ratio, the size and weight limitations of the polarizer, and the wavelength range of operation.

From the output of the polarization control device 360, the sequence of photons 305, 310, 315 is propagated onto the collection surface of a focusing element 365. Types of devices to be employed for the focusing element 365 include, but are not limited to, a single lens, a double lens, an array of lenses, a Fresnel lens, refractive elements, reflective elements (e.g., concave mirrors), and other related lens systems up to the complexity of a fully engineered telescope. The focusing element 365 is used to focus the photons 305, 310, 315 onto a frequency selective electromagnetic detector 760, which may include apparatus 111 of FIG. 2A and/or apparatus 113 of FIG. 3.

Once the frequency selective electromagnetic detector 360 senses the sequence of photons 305, 310, 315, the frequency selective electromagnetic detector 760 emits a sequence of electrical pulses 335, 340, 345. Each of the electrical pulses 335, 340, 345 has a voltage that is proportional to its respective photon's 305, 310, 315 energy level. The sequence of electrical pulses 335, 340, 345 is then inputted into a processor 370 for processing and de-multiplexing. The processor 370 uses the emitted electrical pulse 335, 340, 345 information to determine each of the photon's 305, 310, 315 associated frequency and/or wavelength. After the electrical pulses 335, 340, 345 are de-multiplexed, the processor 370 sends each of the electrical pulses 335, 340, 345 to a different receiver 375, 380, 390.

For the disclosed system 300, a procedure is necessary to provide for frequency calibration. Typically, this involves using emission spectra from samples (e.g., neon and mercury) that have frequency outputs that are well characterized and traceable to a standard calibration, such as the National Institute of Standards and Technology (NIST) standards. With these outputs propagated through the frequency selective electromagnetic detector 160 and operationally correlated to the known standards, the overall system 300 will be frequency calibrated.

In addition, a procedure is necessary to provide for temporal calibration for the system 300. Generally, this involves using timing pulses at one or more frequencies that have pulse spacing that is well defined. Usually, high precision devices will be tied to absolute standards generated by NIST or some other carefully calibrated sources. With these outputs propagated though the frequency selective electromagnetic detector 760 and operationally correlated to the known standards, the overall system 300 will be temporally calibrated.

Example

Raman spectra comparative data of both the thermoelectric nanowire material, and graphene were independently gathered. Raman spectra exemplary data of graphene coupled to an end of a thermoelectric nanowire as in the frequency selective electromagnetic apparatus described above was also gathered. The exemplary spectra data showed broadened graphene peaks that shifted to lower energies as compared to the independently gathered comparative spectra data. While not limited to any particular theory, it is believed that electronic spectral coupling at the interface between the nanowire and graphene, leads to the graphene peaks being broadened and shifted to lower energies (longer wavelengths).

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or descriptions of the present teachings. It will be appreciated that structural components and/or processing stages may be added or existing structural components and/or processing stages may be removed or modified. Further, one or more of the acts depicted herein may be carried out in one or more separate acts and/or phases.

Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein.

The term "about" indicates that the value listed may be somewhat altered, as long as the alteration does not result in nonconformance of the process or structure to the illustrated descriptions. Finally, "exemplary" indicates the description is used as an example, rather than implying that it is an ideal.

Other implementations will be apparent to those skilled in the art from consideration of the specification and practice of what is described herein. It is intended that the specification and examples be considered as exemplary only, with a true scope and spirit of the implementations being indicated by the following claims.

What is claimed is:

1. A frequency selective electromagnetic apparatus, comprising:
   at least one nanowire comprising a first end and a second end, the second end opposite the first end;
   at least one 2-dimensional contact disposed on the first end and in thermal communication, electrical communication, or both thermal and electrical communication with the at least one nanowire, wherein the at least one 2-dimensional contact comprises graphene, and wherein electrical properties of the electrical communication and thermal properties of the thermal communication are decoupled from each other; and
   at least one nanoscale-sized-diameter thermoelectric junction disposed between the at least one 2-dimensional contact and the first end of the at least one nanowire,
   wherein the at least one nanoscale-sized-diameter thermoelectric junction comprises an interface between the at least one 2-dimensional contact and the first end of the at least one nanowire.

2. The apparatus of claim 1, wherein the at least one 2-dimensional contact comprises a single molecule.

3. The apparatus of claim 1, wherein the at least one 2-dimensional contact comprises a thickness of a single molecule.

4. The apparatus of claim 1, wherein the at least one 2-dimensional contact comprises a single layer that comprises a thickness of a single molecule.

5. The apparatus of claim 1, wherein the at least one 2-dimensional contact comprises more than one layer, and at least one of the more than one layer comprises a thickness of a single molecule.

6. The apparatus of claim 5, wherein each of the more than one layer comprise a thickness of a single molecule.

7. The apparatus of claim 1, wherein the graphene is selected from the group consisting of monolayer graphene, bi-layer graphene, few-layer graphene, bromine-intercalated graphene, and mixtures thereof.

8. The apparatus of claim 1, wherein the at least one 2-dimensional contact comprises a first 2-dimensional contact disposed on the first end of the at least one nanowire, and a second 2-dimensional contact disposed on the second end of the at least one nanowire, and
   wherein the first 2-dimensional contact and the second 2-dimensional contact each comprise graphene selected from the group consisting of monolayer graphene, bi-layer graphene, few-layer graphene, bromine-intercalated graphene, and mixtures thereof.

9. The apparatus of claim 8, wherein the graphene of the first 2-dimensional contact is different than the graphene of the second 2-dimensional contact.

10. The apparatus of claim 1, wherein the at least one nanowire comprises a composite nanowire.

11. The apparatus of claim 1, wherein the at least one nanowire comprises a 2-dimensional array of nanowires.

12. The apparatus of claim 1, wherein the at least one nanowire generates a signal in response to receiving a photon.

13. The apparatus of claim 12, further comprising an amplifier that receives the signal generated by the at least one nanowire.

14. The apparatus of claim 1, wherein the at least one nanowire comprises a thermoelectric nanowire.

15. The apparatus of claim 1, wherein the at least one nanowire comprises a material having a thermoelectric response.

16. The apparatus of claim 1, wherein the at least one nanowire comprises beryllium (Be), bismuth (Bi), tellurium (Te), antimony (Sb), tin (Sn), lead (Pb), selenium (Se), nickel (Ni), cobalt (Co), or combinations thereof.

17. The apparatus of claim 1, wherein the thermal communication comprises a change in temperature generated by transport of phonons excited upon the at least one nanowire accepting a photon.

18. The apparatus of claim 1, wherein the electrical communication comprises a change in voltage generated by transport of electrons, holes or both electrons and holes generated upon the at least one nanowire accepting a photon.

19. The apparatus of claim 1, wherein the at least one nanowire comprises a first nanowire and a second nanowire, wherein the second nanowire is disposed adjacent to, but does not physically contact the first nanowire, and wherein the at least one 2-dimensional contact is disposed between the first and the second nanowires.

20. The apparatus of claim 1, further comprising a substrate for accepting heat generated at the at least one nanowire upon the at least one nanowire accepting a photon that generates a charger carrier, and the charge carrier is communicated away from the at least one nanowires.

21. The apparatus of claim 1, wherein the at least one nanowire comprises an array of nanowires, and wherein nanowires of the array of nanowires are formed lithographically, epitaxially, by guided self-assembly, by extrusion, or combinations thereof.

22. The apparatus of claim 1, further comprising at least one optical element that is configured for manipulating electromagnetic energy arriving at the at least one nanowires, the manipulating comprising one or more of filtering, focusing, gathering and collimating the electromagnetic energy.

23. An imaging system, comprising
at least one intensity control device that selects a range of a rate of arrival of photons;
at least one focusing element for focusing the photons;
at least one frequency selective imager that detects the photons that are focused from the at least one focusing element, wherein the at least one frequency selective imager comprises:
an array of nanowires, wherein each of the nanowires comprises a first end and a second end, the second end opposite the first end,
at least one 2-dimensional contact disposed between a first one and second one of the nanowires, wherein the at least one 2-dimensional contact is disposed on the first end of the first one or the second one of the nanowires and is in thermal communication, electrical communication, or both thermal and electrical communication with the first one and second one of the nanowires, wherein the at least one 2-dimensional contact comprises graphene and wherein electrical properties of the electrical communication and thermal properties of the thermal communication are decoupled from each other, and
at least one nanoscale-sized-diameter thermoelectric junction disposed between the at least one 2-dimensional contact and the first end of the first one or the second one of the nanowires, wherein the at least one nanoscale-sized-diameter thermoelectric junction comprises an interface between the at least one 2-dimensional contact and the first end of the at least one nanowire,
wherein the frequency selective imager senses at least one photon and emits at least one electrical pulse having a voltage that is proportional to an energy level of the at least one photon;
at least one processor for processing the at least one electrical pulse and for generating a multi-spectral image from information from the at least one electrical pulse; and
a display for displaying the multi-spectral image.

24. The imaging system of claim 23, wherein the array comprises a 2-dimensional array of nanowires.

25. The imaging system of claim 23, wherein the graphene is selected from the group consisting of monolayer graphene, bi-layer graphene, few-layer graphene, bromine-intercalated graphene, and mixtures thereof.

26. The imaging system of claim 23, wherein the nanowires comprise a material having a thermoelectric response.

27. The imaging system of claim 23, further comprising at least one polarization control device for selecting a polarization of the photons.

28. A communications system, the system comprising:
at least one intensity control device that selects a range of a rate of arrival of photons;
at least one focusing element for focusing the photons;
at least one frequency selective electromagnetic detector that detects the photons that are focused from the at least one focusing element, wherein the at least one frequency selective electromagnetic detector, comprises:
an array of nanowires, wherein each of the nanowires comprises a first end and a second end, the second end opposite the first end,
at least one 2-dimensional contact disposed between a first one and second one of the nanowires, wherein the at least one 2-dimensional contact is disposed on the first end of the first one or the second one of the nanowires and is in thermal communication, electrical communication, or both thermal and electrical communication with the first one and second one of the nanowires, wherein the at least one 2-dimensional contact comprises graphene, and wherein electrical properties of the electrical communication and thermal properties of the thermal communication are decoupled from each other, and
at least one nanoscale-sized-diameter thermoelectric junction disposed between the at least one 2-dimensional contact and the first end of the first one or the second one of the nanowires, wherein the at least one nanoscale-sized-diameter thermoelectric junction comprises an interface between the at least one 2-dimensional contact and the first end of the at least one nanowire,
wherein the frequency selective electromagnetic detector detects at least one photon, the at least one frequency selective electromagnetic detector emits at least one electrical pulse having a voltage that is proportional to an energy level of at least one photon; and
at least one processor for processing the at least one electrical pulse and for generating a multi-spectral image from information from the at least one electrical pulse.

29. The communications system of claim 28, wherein the graphene is selected from the group consisting of monolayer graphene, bi-layer graphene, few-layer graphene, bromine-intercalated graphene, and mixtures thereof.

30. The communications system of claim 28, further comprising at least one polarization control device for selecting a polarization of the photons.

31. The communications system of claim 28, wherein the array of nanowires comprises a 2-dimensional array of nanowires.

32. The apparatus of claim 1, wherein the first end and the second end comprise end faces of the nanowire.

33. The apparatus of claim 1, wherein the graphene comprises bromine-intercalated graphene.

34. The apparatus of claim 33, wherein the bromine is disposed between layers of the graphene.

35. The apparatus of claim 1, wherein the graphene comprises 3-7 atomic layers.

36. The apparatus of claim 1, wherein the graphene is present at ends of the thermoelectric nanowire.

\* \* \* \* \*